United States Patent
Jacobine et al.

(10) Patent No.: US 8,986,847 B2
(45) Date of Patent: Mar. 24, 2015

(54) ACCELERATOR/OXIDANT/PROTON SOURCE COMBINATIONS FOR TWO PART CURABLE COMPOSITIONS

(71) Applicant: Henkel Corporation, Rocky Hill, CT (US)

(72) Inventors: Anthony F. Jacobine, Meriden, CT (US); Andrew D. Messana, Newington, CT (US); Joel D. Schall, Hamden, CT (US); Lynnette Hurlburt, Manchester, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 38 days.

(21) Appl. No.: 13/795,713

(22) Filed: Mar. 12, 2013

(65) Prior Publication Data

US 2014/0004366 A1 Jan. 2, 2014

Related U.S. Application Data

(60) Provisional application No. 61/664,783, filed on Jun. 27, 2012.

(51) Int. Cl.
*B32B 27/00* (2006.01)
*C08F 120/18* (2006.01)
*C09J 11/06* (2006.01)

(52) U.S. Cl.
CPC .................................. *C09J 11/06* (2013.01)
USPC ........................................ 428/500; 526/329.7

(58) Field of Classification Search
None
See application file for complete search history.

(56) References Cited

U.S. PATENT DOCUMENTS

| | | |
|---|---|---|
| 3,218,305 A | 11/1965 | Krieble |
| 4,180,640 A | 12/1979 | Melody et al. |
| 4,287,330 A | 9/1981 | Rich |
| 4,321,349 A | 3/1982 | Rich |
| 5,605,999 A | 2/1997 | Chu et al. |
| 6,043,327 A | 3/2000 | Attarwala |
| 2010/0249266 A1 * | 9/2010 | Yarimizu et al. ............... 523/116 |

OTHER PUBLICATIONS

Rich, "Anaerobic Adhesives", Handbook of Adhesive Technology, 29, 467-79, A. Pizzi and K.L. Mittal, eds., Marcel Dekker, Inc., New York (1994), pp.

* cited by examiner

*Primary Examiner* — Sheeba Ahmed
(74) *Attorney, Agent, or Firm* — Steven C. Bauman

(57) ABSTRACT

Benzoylthiourea or benzoylthiourethane derivatives, together with oxidants and a source of protons, acting as cure accelerators for two part curable compositions are provided.

11 Claims, No Drawings

ACCELERATOR/OXIDANT/PROTON SOURCE COMBINATIONS FOR TWO PART CURABLE COMPOSITIONS

BACKGROUND

1. Field

Benzoylthiourea or benzoylthiourethane derivatives together with oxidants and a source of protons acting as cure accelerators for two part curable compositions are provided.

2. Brief Description of Related Technology

Curable adhesive and sealant compositions oftentimes rely on curatives to make them commercially attractive options for end users. Curable adhesive and sealant compositions come in one part formats, two part formats and two step formats depending on the performance profile they are designed to meet and the constituents used to prepare the compositions. Anaerobic adhesives are prominent one part compositions and generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Anaerobic cure-inducing compositions ordinarily used in commercial anaerobic adhesive and sealant compositions to induce and accelerate cure ordinarily include saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as napthaquinone and anthraquinone. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

GC Corporation submitted to the U.S. Patent and Trademark Office a patent application, which published as U.S. Patent Application Publication No. 2010/0249266, and is directed to a polymerizable composition comprising a first paste and a second paste, where the first paste comprises a polymer of α,β unsaturated monocarboxylic acid or α,β unsaturated dicarboxylic acid, water, and a hydroperoxide as a peroxide, and where the second paste comprises a (meth) acrylate compound not having an acid group, fluoroaluminosilicate glass powder, a thiourea derivative as a reducing material, and a vanadium compound as a polymerization accelerator.

Notwithstanding the state of the technology, there is an on-going desire to find alternative technologies for accelerating the cure of curable compositions to differentiate existing products and provide supply assurances in the event of shortages or cessation of supply of raw materials. Accordingly, it would be desirable to identify new materials, which function as accelerators for curable compositions.

SUMMARY

Benzoylthiourea or benzoylthiourethane derivatives for use as accelerators for two part curable compositions are provided.

The two part curable compositions use in one part a proton source and a benzoylthiourea or benzoylthiourethane derivatives and in another an oxidant, where at least one of the first part or the second part also includes a (meth)acrylate component. The two part curable compositions are useful as adhesives or sealants.

The proton source may be chosen from a host of materials, such as water, alcohols, acids, and aldehydes, described in more details below.

The benzoylthiourea or benzoylthiourethane derivatives may be within general structure I

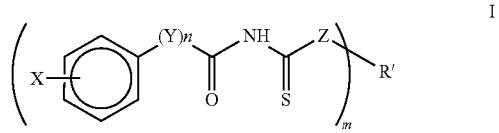

where Z is O or N—R, where R is selected from hydrogen, alkyl, alkenyl, hydroxyalkyl, hydroxyalkenyl, carbonyl, alkylene (meth)acrylate, carboxyl, or sulfonato, or R' is a direct bond attaching to the phenyl ring; R' is selected from hydrogen, alkyl, alkenyl, cycloalkyl, aryl, hydroxyalkyl, hydroxyalkenyl, alkylene- or alkenylene-ether, carbonyl, alkylene (meth)acrylate, carboxyl, nitroso or sulfonato; X is halogen, alkyl, alkenyl, hydroxyalkyl, hydroxyalkenyl, alkoxy, amino, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

A more specific general structure is shown below:

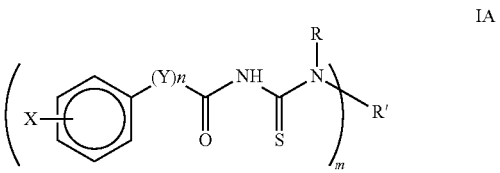

where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

More specifically, the benzoylthiourea or benzoylthiourethane derivatives may be within structures II or IIA, respectively

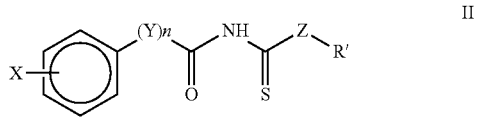

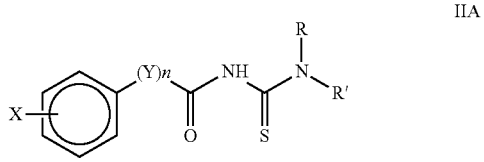

where R, R', Z, X, Y, and n are as defined above.

More specific examples of the benzoylthiourea or benzoylthiourethane derivatives within structures II and IIA, respectively, are set forth below

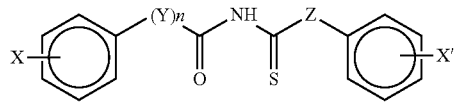

III

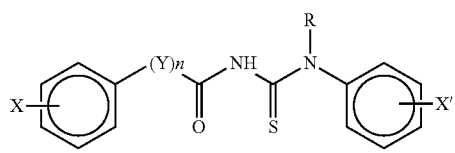

IIIA where R, X, Y, and n are as defined above, and X' is defined as X.

Alternatively, the benzoylthiourea or benzoylthiourethane derivatives within structure I may be a bis version, where R' is a linker. That is,

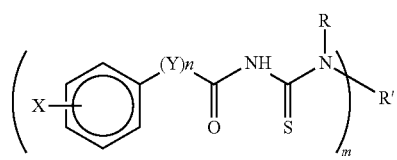

IV where R, R', X, Y, and n are as defined above, and m is 2.

Thus, also provided are curable compositions and cure systems prepared with such cure accelerators, methods of preparing and using the inventive cure accelerators and curable compositions, as well as reaction products of the curable compositions.

The benzoylthiourea or benzoylthiourethane derivatives act to accelerate cure of the two part curable compositions when used with an oxidant and a proton source, and provide compositions with good cure through volume. The present invention will be more fully appreciated by a reading of the "Detailed Description", and the illustrative examples which follow thereafter.

DETAILED DESCRIPTION

Two part curable compositions are provided. In one part as an accelerator is the benzoylthiourea or benzoylthiourethane derivatives together with a proton source; in the other part is an oxidant. Of course, one or both parts has a (meth)acrylate component, as well.

Here, the benzoylthiourea or benzoylthiourethane derivatives are within structure I

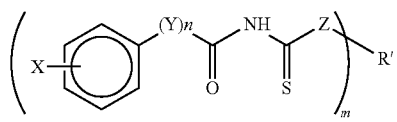

I where Z is O or N—R, where R is selected from hydrogen, alkyl, alkenyl, aryl, hydroxyalkyl, hydroxyalkenyl, alkylene (meth)acrylate, carbonyl, carboxyl, or sulfonato, and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

As noted above, a more specific general structure is shown below:

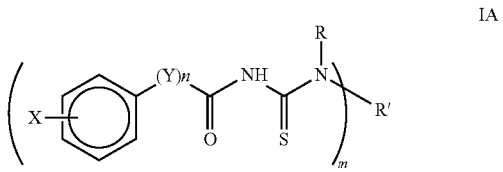

IA where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

More specifically, the benzoylthiourea or benzoylthiourethane derivatives may be within structures II and IIA respectively

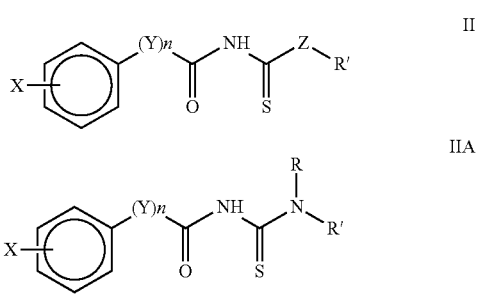

II

IIA where R, R', X, Y, and n are as defined above.

More specific example of the benzoylthiourea or benzoylthiourethane derivatives within structures II and IIA, respectively, are set forth below

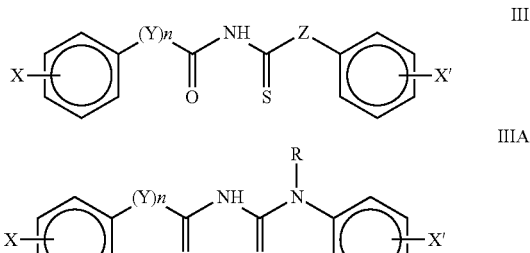

III

IIIA where R, X, Y, and n are as defined above, and X' is defined as X.

And even more specifically, the benzoylthiourea or benzoylthiourethane derivatives include

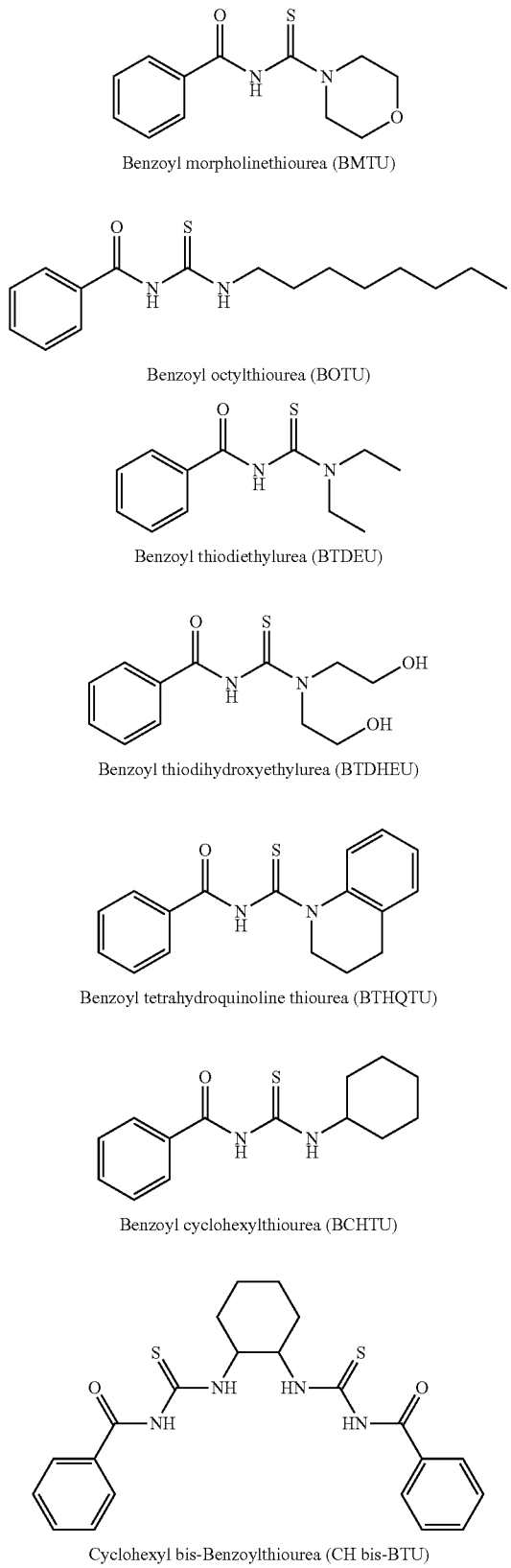

Benzoyl morpholinethiourea (BMTU)

Benzoyl octylthiourea (BOTU)

Benzoyl thiodiethylurea (BTDEU)

Benzoyl thiodihydroxyethylurea (BTDHEU)

Benzoyl tetrahydroquinoline thiourea (BTHQTU)

Benzoyl cyclohexylthiourea (BCHTU)

Cyclohexyl bis-Benzoylthiourea (CH bis-BTU)

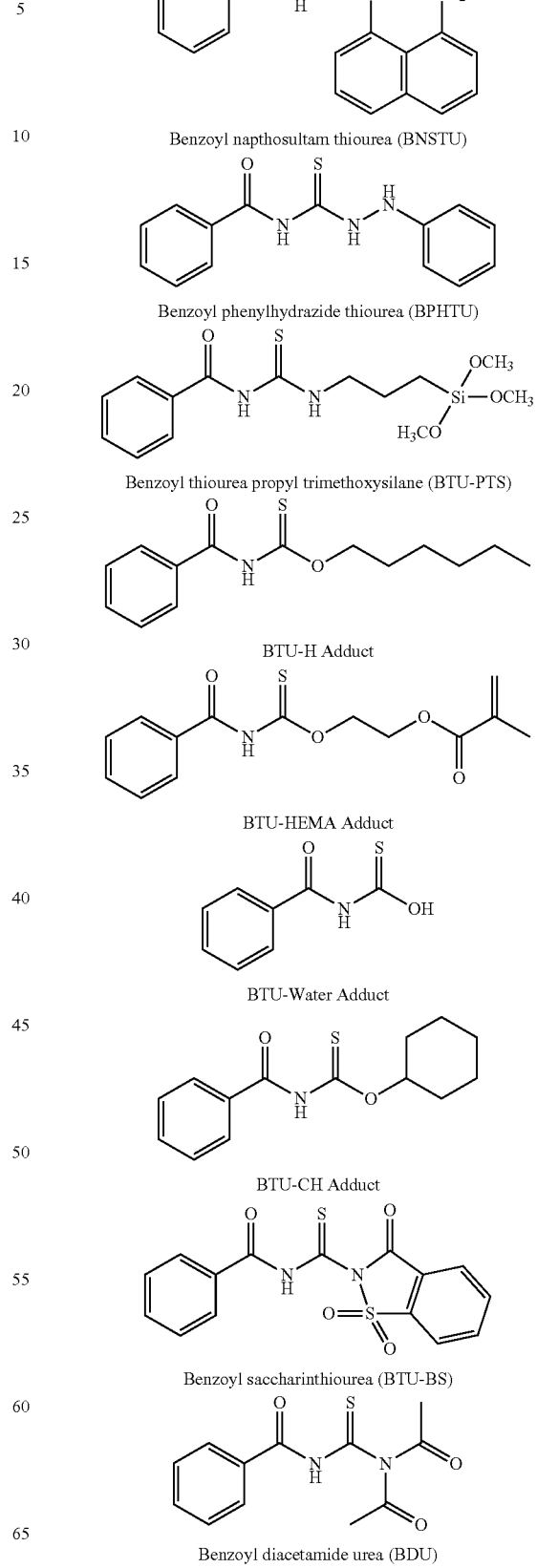

Benzoyl napthosultam thiourea (BNSTU)

Benzoyl phenylhydrazide thiourea (BPHTU)

Benzoyl thiourea propyl trimethoxysilane (BTU-PTS)

BTU-H Adduct

BTU-HEMA Adduct

BTU-Water Adduct

BTU-CH Adduct

Benzoyl saccharinthiourea (BTU-BS)

Benzoyl diacetamide urea (BDU)

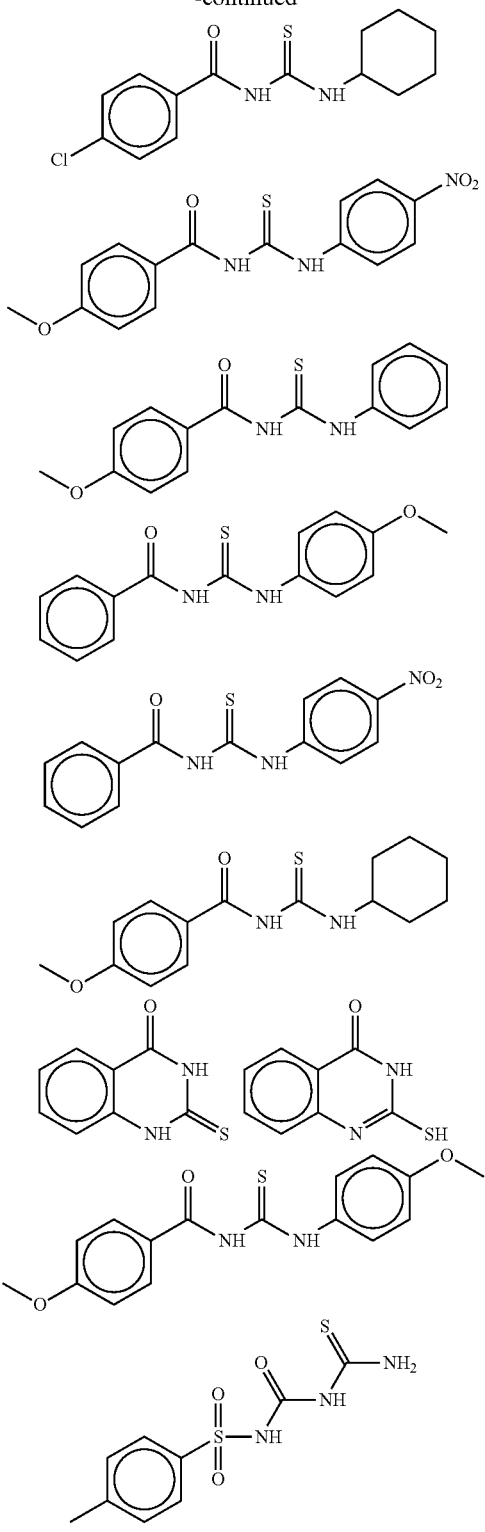

The benzoylthiourea or benzoylthiourethane derivatives display good solubility, stability and/or activity as cure accelerators in the two part curable compositions.

The benzoylthiourea or benzoylthiourethane derivatives may be used in amounts of about 0.1 to about 5 percent by weight, such as about 1 to about 2 percent by weight, based on the total weight of the composition.

The proton source may be chosen from water, alcohols, acids, and aldehydes. Where the proton source is an alcohol, the alcohol may be selected from hydroxy alkyl (meth)acrylates, alkanols, alkane di- and polyols. The hydroxy alkyl (meth)acrylates may be selected from hydroxyethyl (meth)acrylates and hydroxypropyl (meth)acrylates, to name a few. The alkanol or di- and polyol may be a glycol, glycerol, a terpene alcohol like citronellol, or cinnamyl alcohol.

Where the proton source is an acid, the acid may be selected from acrylic acid and polymeric versions thereof, lactic acid, citric acid, ascorbic acid and combinations thereof.

Where the proton source is an aldehyde, the aldehyde may be selected from formaldehyde, acetaldehyde, ethyl aldehyde, propyl aldehydes, butyl aldehydes and benzaldehyde.

Here, such proton sources should be used in an amount in the range of from about 0.1 to about 10 percent by weight, based on the total weight of the composition, with about 1 to about 5 percent by weight being desirable.

The proton source may also be a silanol, in which case the silanol may be found on the surface of a glass substrate.

The oxidant should be one that is liberated through contact with the proton source. In this way, the rate and degree of reactivity and consequently cure may be tailored by the selection of the various oxidants, proton sources and benzoylthiourea or benzoylthiourethane derivatives.

Accordingly, a number of well-known oxidants may be used including, without limitation, hydroperoxides, such as cumene hydroperoxide ("CHP"), para-menthane hydroperoxide, t-amyl hydroperoxide, 1,1,3,3-tetramethylbutyl hydroperoxide and t-butyl hydroperoxide ("TBH"). Other peroxides include t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof. Of particularly interest are complexes of peroxides and polymers, such as the hydrogen peroxide/poly-pyrrolidone complex available commercially from Ashland Inc. under the trade name PEROXYDONE.

It may be desirable in some instances to provide the oxidant in an encapsulated form.

Such oxidants are typically employed in the range of from about 0.1 to about 10 percent by weight, based on the total weight of the composition, with about 1 to about 5 percent by weight being desirable.

In one aspect, therefore, the invention provides a two part curable composition, comprising:

Part A: A proton source and one or more compounds within structures I or IA below:

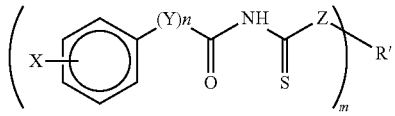

(I)

where Z is O or N—R, where R is selected from hydrogen, alkyl, alkenyl, aryl, hydroxyalkyl, hydroxyalkenyl, alkylene (meth)acrylate, carbonyl, carboxyl, or sulfonato, and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

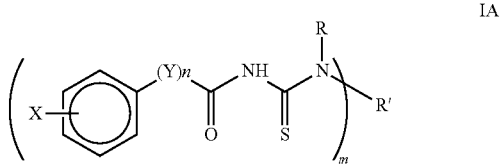

IA where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, sulfonate, hydroxyl or haloalkyl; and Y is —SO$_2$NH—, —CONH—, —NH—, and —PO(NHCONHCSNH$_2$)NH—; and n is 0 or 1 and m is 1 or 2; and Part B: an oxidant,
where at least one of Part A or Part B comprises a (meth)acrylate component.

(Meth)acrylate monomers suitable for use as the (meth)acrylate component in the curable compositions may be chosen from a wide variety of materials, such as these represented by H$_2$C=CGCO$_2$R$^1$, where G may be hydrogen or alkyl groups having from 1 to about 4 carbon atoms, and R$^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol)dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Additional components may be included in traditional curable compositions to alter the physical properties of either the curable compositions or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see U.S. Pat. No. 6,043,327, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The curable compositions may also include other conventional components, such as free radical initiators, other free radical co-accelerators, inhibitors of free radical generation, as well as metal catalysts, such as iron and copper. Depending on the cure environment some or all of these components might ordinarily be used, particularly if cure is to occur under anaerobic conditions.

Stabilizers and inhibitors (such as phenols including hydroquinone and quinones) may also be employed to control and prevent premature oxidant decomposition and polymerization of the curable compositions.

Other agents such as thickeners, non-reactive plasticizers, fillers, toughening components (such as elastomers and rubbers), and other well-known additives may be incorporated therein where the art-skilled believes it would be desirable to do so.

Also provided are methods of preparing and using the inventive curable compositions, as well as reaction products of the compositions.

The curable compositions may be prepared using conventional methods which are well known to those persons of skill in the art. For instance, the components of the curable compositions may be mixed together in any convenient order consistent with the roles and functions the components are to perform in the compositions. Conventional mixing techniques using known apparatus may be employed.

The curable compositions may be applied to a variety of substrates to perform with the desired benefits and advantages described herein. For instance, appropriate substrates may be constructed from steel, brass, copper, aluminum, zinc, glass and other metals and alloys, ceramics and thermosets. Glass is also a desirable surface.

The surface of the substrates to be bonded may be primed with a proton source as well. In this regard, the two part curable composition is used in a two step adhesive system.

The invention also provides a process for preparing a reaction product from the two part curable composition, steps of which include applying the two part curable composition to a desired substrate surface, mixing the two parts of the two part curable composition, either before or after application on the substrate, and exposing the mixed, two part curable composition to appropriate conditions for a time sufficient to cure the composition.

This invention also provides a method of using as an accelerator for two part curable compositions the so-described benzoylthiourea or benzoylthiourethane derivatives.

And the present invention provides a bond formed between two mated substrates with the two part curable composition using the so-described benzoylthiourea or benzoylthiourethane derivatives.

In view of the above description, it is clear that a wide range of practical opportunities is provided. The following examples are provided for illustrative purposes only, and are not to be construed so as to limit in any way the teaching herein.

EXAMPLES

Many of the so-described benzoylthiourea or benzoylthiourethane derivatives were synthesized as set forth below.

A. Syntheses

Benzoyl Isothiocyanate

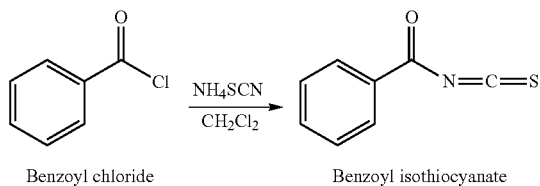

Benzoyl chloride        Benzoyl isothiocyanate

Benzoyl isothiocyanate was prepared as a starting material for benzoyl thiourea and derivatives thereof. In a 500 mL three-neck round-bottom flask ("RBF"), fitted with a condenser, thermo-probe, sealed system nitrogen purge, pressure-equilibrated addition funnel and mechanical stirrer, were placed solid ammonium thiocyanate (16.9 g, 0.22 mol) and dichloromethane (100 mL). The stirred mixture was cooled in an ice-water bath to a temperature of about 10-15° C. To the stirred mixture was added a solution of benzoyl chloride (28.4 g, 0.2 mol) in dichloromethane (50 mL) over a period of time of 20 minutes and the reaction mixture was warmed to a temperature near reflux (39° C.) for a period of time of 1 hour. Reaction completion was confirmed by FT-IR analysis. The solution was then cooled to a temperature of about 10-15° C. The solution can be concentrated to an oil to provide the benzoyl isothiocyanate. A boiling point of 128-131° C. at 15 mm Hg was measured.

FT-IR, ATR-Accessory, 3063 cm$^{-1}$ (aromatic C—H), 2000-1921 (—NCS aromatic isothiocyanate), 1685 (carbonyl), 1230 (—C—N—), 846 (aromatic thioisocyanate).

$^{1}$H NMR-DMSOd$_6$, δ 8.05 (s, multiplet, aromatic H), 7.70 (s, triplet, aromatic H), 7.50 (s, triplet, aromatic H).

$^{13}$C NMR-DMSOd$_6$, δ 161.0 (s, singlet, Ar—CO—), 148.0 (s, singlet, —NCS), 135.0 (m, singlet, aromatic C), 130.0 (s, singlet, aromatic C), 128.0 (s, singlet, aromatic C).

Benzoylthiourea

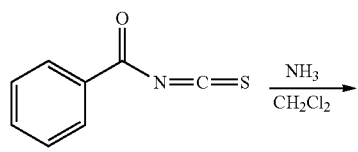

Benzoyl isothiocyanate

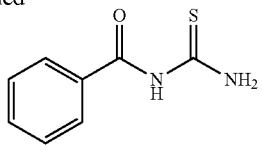

Benzoylthiourea

The RBF was changed to include a sealed glass-fritted bubbler system connected to an ammonia gas supply and an exit bubbler-scrubber system. To the clear cold reaction mixture (controlled at a temperature below 30° C. with an external ice-water bath) was slowly purged ammonia gas. During the addition, ammonia was consumed and the reaction mixture slowly became pale and cloudy/milky in appearance. The mixture was allowed to warm to room temperature, and stirring continued for an additional hour after ammonia addition ceases. Nitrogen gas was then re-introduced into the system to purge residual ammonia gas. The resulting solid is collected by vacuum filtration and washed with additional dichloromethane to provide a slightly yellow solid, which was recrystallized from ethanol. The solid was then dried to a constant weight in vacuo at a temperature of 50° C. and a pressure of <1 mTorr. The resulting solid was observed to have a melting point of 171.62° C., as determined by DSC.

FT-IR, ATR-Accessory, 3301-3146 cm$^{-1}$ (—NH$_2$ and —NH—), 1675 (carbonyl), 1599, 1526 and 1403 (—NCSN—), 1233 (—C—N—).

$^{1}$H NMR-DMSOd$_6$, δ 11.1 ppm (m, singlet, —NH—), 9.90 and 9.55 (m, doublet, —NH$_2$), 7.90 (s, doublet, aromatic H), 7.60-7.40 (s, multiplet, aromatic H), 3.65 (s, singlet, solvent exchange).

$^{13}$C NMR-DMSOd$_6$, δ 187.5 ppm (NH—CS—NH$_2$), 173.5 (Ar—CO—), 139.0-132.0 (aromatic C).

Benzoyl Thiourea Adducts Made from Amine- or Nitrogen-containing Compounds

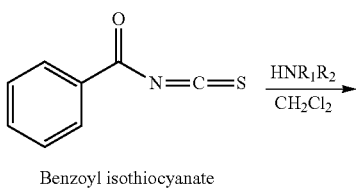

Benzoyl isothiocyanate

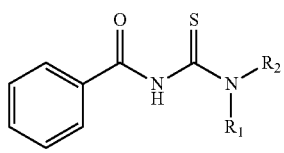

Benzoylthiourea Adduct

Benzoyl Morpholine Thiourea ("BMTU") Adduct

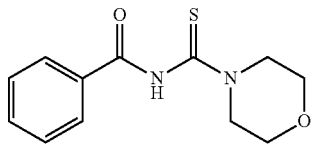

Benzoyl morpholinethiourea (BMTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point morpholine (13.21 g, 0.150 mol) and dichloromethane (100 mL) were added slowly over a period of time of about 30 minutes. The ice-water bath was removed and the reaction mixture was stirred overnight under a nitrogen purge. The reaction mixture was then concentrated in vacuo at a temperature of 40° C. to provide a crude yellow solid. The solid was recrystallized from refluxing ethyl acetate (50 mL) to provide a yellow solid that was dried to constant weight in vacuo at a temperature of 50° C. and a pressure of <1 mTorr in a 82% yield. The solid was determined to have a melting point of 138° C.

Benzoyl Octyl Thiourea ("BOTU") Adduct

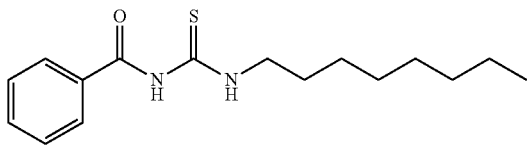

Benzoyl octylthiourea (BOTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath to a temperature of below 5° C., at which point octylamine (19.6 g, 0.150 mol) and dichloromethane (100 mL) was added slowly over a period of time of 30 minutes. The ice-water bath was removed and the reaction mixture was stirred at room temperature under a nitrogen purge overnight. The reaction mixture was washed with water, and the organic layer separated, dried with anhydrous magnesium sulfate, filtered and concentrated in vacuo at a temperature of 40° C. to provide an orange oil. The oil was dried to constant weight in vacuo at a temperature of 50° C. and a presence of <1 mTorr in a 95% yield.

Benzoyl Thiodiethylurea ("BTDEU") Adduct

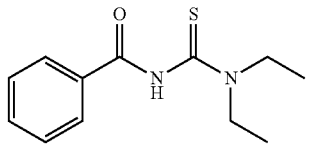

Benzoyl thiodiethylurea (BTDEU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point diethylamine (15.0 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield.

Benzoyl Thiodihydroxyethylurea ("BTDHEU") Adduct

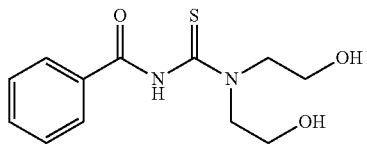

Benzoyl thiodihydroxyethylurea (BTDHEU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point dihydroxyethylamine (15.9 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 97% yield.

Benzoyl Tetrahydroquinoline Thiourea ("BTHQTU") Adduct

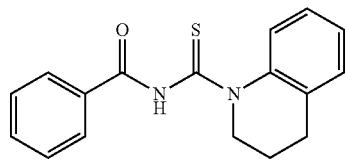

Benzoyl tetrahydroquinoline thiourea (BTHQTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point tetrahydroquinoline (20.4 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 93% yield. The solid was determined to have a melting point of 143.6° C.

Benzoyl Cyclohexythiourea ("BCHTU") Adduct

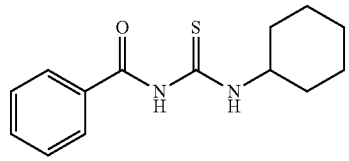

Benzoyl cyclohexylthiourea (BCHTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point cyclohexylamine (15.0 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield. The solid was determined to have a melting point of 67.8° C.

Cyclohexyl Bis-Benzoylthiourea ("CHbisBTU") Adduct

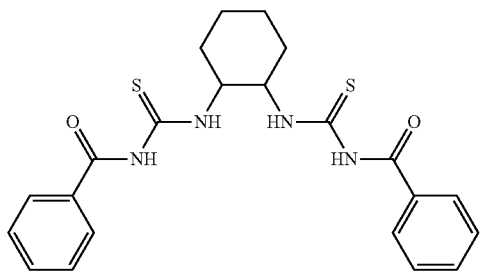

Cyclohexyl bis-Benzoylthiourea (CH bis-BTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point benzoyl isothiocyanate (50.0 g, 0.300 mol) and cyclohexyldiamine (17.42 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield.

Benzoyl Naphthosultamthiourea ("BNSTU") Adduct

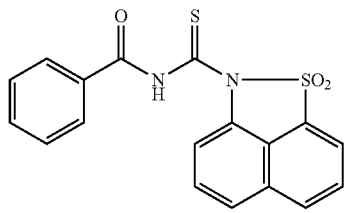

Benzoyl napthosultam thiourea (BNSTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point naphthosultam (31.4 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a brown solid. The brown solid was recrystallized from refluxing ethyl acetate (150 mL) to provide a tan solid that was dried to constant weight in vacuo at a temperature of 50° C. and a pressure of <1 mTorr in a 77% yield. The resulting solid was observed to have a melting point of 264° C.

Benzoyl Phenylhydrazinethiourea ("BPHTU") Adduct

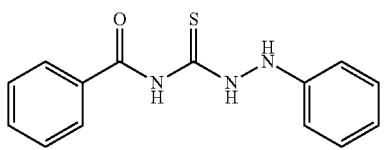

Benzoyl phenylhydrazide thiourea (BPHTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point phenylhydrazine (16.7 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 97% yield.

Benzoyl Thiourea Propyltrimethoxysilane ("BTU-TMS") Adduct

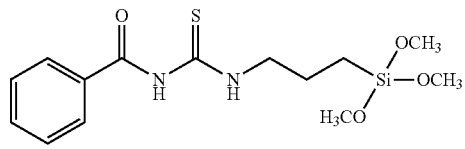

Benzoyl thiourea propyl trimethoxysilane (BTU-PTS)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The reaction mixture was cooled in an ice-water bath to a temperature below 5° C., at which point 3-aminopropyl trimethoxysilane (27.7 g, 0.150 mol) and dichloromethane (100 mL) were added slowly over a period of time of 30 minutes. The ice-water bath was removed and the reaction mixture was stirred at room temperature under a nitrogen purge overnight. The reaction mixture was then concentrated in vacuo at a temperature of 40° C. to provide a clear red liquid. The liquid was dried to constant weight in vacuo at a temperature of 50° C. and a pressure of <1 mTorr in a 97% yield.

Benzoyl Thiourea JEFFAMINE ("BTU-JEFFAMINE") Adduct

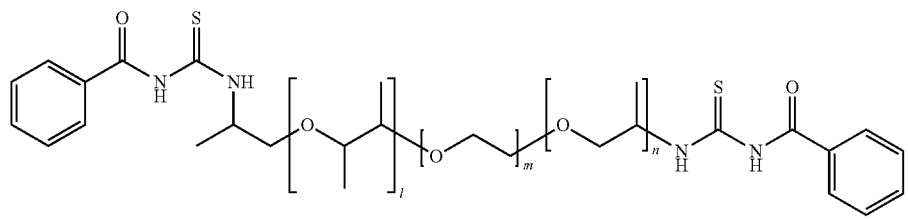

BTU Jeffamine ED-900 Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The reaction mixture was cooled in an ice-water bath to a temperature below 5° C., at which point JEFFAMINE ED-900 (67.5 g, 0.075 mol) and dichloromethane (100 mL) was added slowly over a period of time of 30 minutes. JEFFAMINE ED-900, according to the manufacturer Huntsman Corporation, Woodlands, Tex., is a polyether diamine based on a predominantly PEG backbone, with a molecular weight of 900. In the structure given above, l is about 12.5, and m+n is about 6.

The ice-water bath was removed and the reaction mixture was stirred at room temperature under a nitrogen purge overnight. The cloudy solution was then concentrated in vacuo at a temperature of 40° C. to provide a pale amber oil. The liquid was dried to constant weight in vacuo at a temperature of 50° C. and a pressure of <1 mTorr in a 99% yield.

Benzoyl Saccharin Thiourea ("BSTU") Adduct

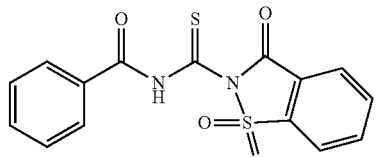

Benzoyl saccharinthiourea (BTU-BS)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) and saccharin (28.1 g, 0.150 mol) followed by dichloromethane (100 mL). The mixture was cooled in an ice-water bath at a temperature below 5° C., at which point water (28.1 g, 0.150 mol) and acetone as the solvent and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a solid that was dried to constant weight in vacuo at a temperature of 50° C. and a pressure of <1 mTorr in a 37% yield.

Benzoyl Diacetamide Thiourea ("BDTU") Adduct

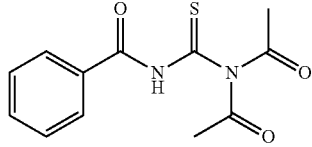

Benzoyl diacetamide urea (BDU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point diacetamide (15.3 g, 0.150 mol) and acetone as the solvent and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. and then dried to constant weight in vacuo at a temperature of 50° C. and a pressure of <1 mTorr.

para-Toluene Sulfonyl Thiourea ("PTSTU") Adduct

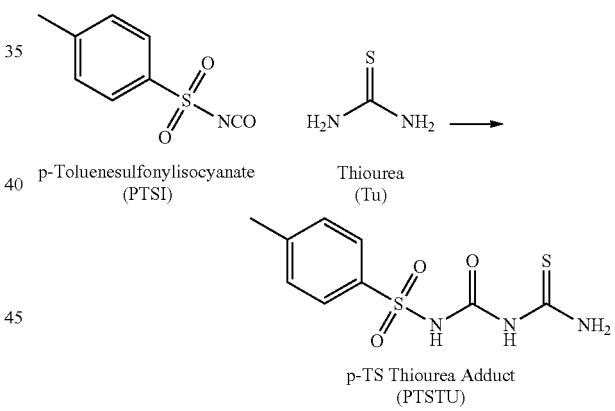

p-Toluenesulfonylisocyanate (PTSI)  Thiourea (Tu)

p-TS Thiourea Adduct (PTSTU)

In a 100 mL RBF equipped with a condenser, thermo-probe, sealed system nitrogen purge, pressure-equilibrated addition funnel and magnetic stirrer were placed thiourea (9.36 g, 0.12 mol) and dioxane (50 mL). The mixture was warmed to a temperature of 100° C. to encourage dissolution. The mixture was then cooled to a temperature of about 20° C., at which point para-toluenesulfonylisocyanate (25.0 g, 0.12 mol) was added slowly over a period of time of 1 hour. A milky-white suspension was observed to form. The temperature was maintained with an ice-water bath between 20° C. and 32° C. The reaction mixture was stirred overnight at room temperature before it was concentrated in vacuo at a temperature of 40° C. to yield a white solid that was further dried to constant weight in vacuo at a temperature of 50° C. and a pressure of <1 mTorr.

Benzoyl Dodecylthiourea ("BDDTU") Adduct

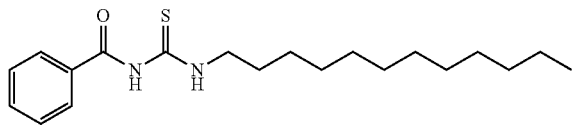 [SMILES: CCCCCCCCCCCCNC(=S)NC(=O)c1ccccc1]

In a 250 mL 3-neck RBF equipped with a condenser, thermo-probe, sealed system nitrogen purge, pressure-equilibrated addition funnel and magnetic stirrer were placed benzoyl isothiocyanate (25.0 g, 0.150 mol) and ethyl acetate (100 mL). The mixture was cooled in an ice-water bath below 5° C., at which point melted dodecylamine (29.3 g, 0.150 mol) (m.p. 30° C.) and ethyl acetate (100 mL) was added slowly over a period of time of 0.5 hours. The ice-water bath was removed and the cloudy solution was stirred at 40° C. under nitrogen purge overnight. The organic phase was separated, washed with water, dried over anhydrous magnesium sulfate, filtered and concentrated in vacuo at a temperature of 40° C. to yield a yellow powdery solid. The solid was dried to constant weight in vacuo at 40° C. and <1 mTorr (99%).

Benzoyl Octadecylthiourea (BODTU) Adduct

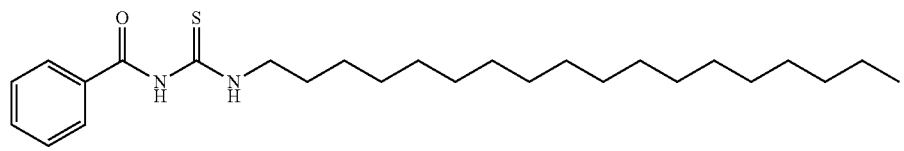 [SMILES: CCCCCCCCCCCCCCCCCCNC(=S)NC(=O)c1ccccc1]

In a 500 mL 3-neck RBF equipped with a condenser, thermo-probe, sealed system nitrogen purge, pressure-equilibrated addition funnel and magnetic stirrer were placed benzoyl isothiocyanate (16.07 g, 96.5 mol) and ethyl acetate (50 mL). The mixture was cooled in an ice-water bath below 5° C., at which point melted octadecylamine (26.5 g, 96.5 mol) (m.p. 55° C.) and ethyl acetate (50 mL) was added slowly over a period of time of 1 hour. The ice-water bath was removed and the cloudy solution was stirred at 50° C. under nitrogen purge overnight. The organic phase was separated, washed with water, dried over anhydrous magnesium sulfate, filtered and concentrated in vacuo at a temperature of 40° C. to yield a pale powdery (waxy) solid. The solid was dried to constant weight in vacuo at 40° C. and <1 mTorr (99%).

Benzoyl Thiourea Adducts Made from Hydroxyl-Containing Compounds

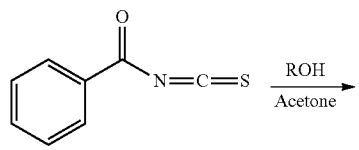

Benzoyl isothiocyanate (1)

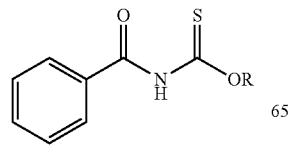

Benzoyl Thiourea Hexanol ("BTU-H") Adduct

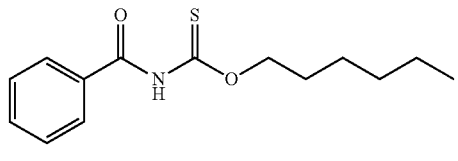

BTU-H Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point hexanol (15.5 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a yellow solid. The solid was dried to constant weight in vacuo at a temperature of 50° C. and a pressure of <1 mTorr in a 83% yield.

Benzoyl Thiourea Hydroxyethyl Methacrylate ("BTU-HEMA") Adduct

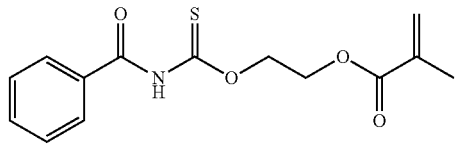

BTU-HEMA Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point hydroxyethyl methacrylate (19.5 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a pale yellow solid. The solid was dried to constant weight in vacuo at a temperature of 50° C. and a pressure of <1 mTorr in a yield of 77%.

Benzoyl Thiourea Water ("BTU-W") Adduct

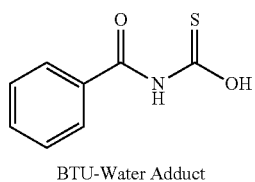 [SMILES: O=C(NC(O)=S)c1ccccc1]

BTU-Water Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point water (2.7 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a pale yellow solid. The solid was dried to constant weight in vacuo at a temperature of 50° C. and a pressure of <1 mTorr in a 36% yield.

Benzoyl Thiourea Cyclohexyl ("BTU-CH") Adduct

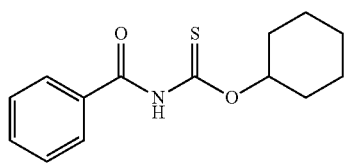

BTU-CH Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point cyclohexanol (15.2 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. and then was dried to constant weight in vacuo at a temperature of 50° C. and a pressure of <1 mTorr.

B. Adhesive Formulations

Sample Nos. 1-10 were prepared from the noted constituents in Tables 1 and 2 below, with the (meth)acrylate component being in each case 1,4-butanediol diacrylate in an amount of about 1500 mg and the oxidant being in each case PEROXYDONE in an amount of about 50 mg. The TU and the proton source were varied for each sample and the proton source in each case was added last.

TABLE 1

| Components | | Sample No./(Amt./mg) | | | | |
|---|---|---|---|---|---|---|
| Type | Identity | 1 | 2 | 3 | 4 | 5 |
| TU | BTU | 50 | 50 | 50 | 50 | 50 |
|  | BOTU | — | — | — | — | — |
|  | BDHETU | — | — | — | — | — |
| Proton source | Water | — | 50 | — | — | 50 |
|  | Isopropanol | — | — | — | — | — |
|  | HPMA | — | — | — | — | — |

TABLE 2

| Components | | Sample No./(Amt./mg) | | | | |
|---|---|---|---|---|---|---|
| Type | Identity | 6 | 7 | 8 | 9 | 10 |
| TU | BTU | — | — | — | 50 | 50 |
|  | BOTU | 50 | 50 | — | — | — |
|  | BDHETU | — | — | 50 | — | — |

TABLE 2-continued

| Components | | Sample No./(Amt./mg) | | | | |
|---|---|---|---|---|---|---|
| Type | Identity | 6 | 7 | 8 | 9 | 10 |
| Proton source | Water | — | 50 | 50 | — | — |
|  | Isopropanol | — | — | — | 50 | — |
|  | HPMA | — | — | — | — | 50 |

Each sample was mixed by hand for about 5 seconds. Sample Nos. 1-10 were evaluated, and the results shown below in Tables 1a and 2a:

TABLE 1a

| Sample No./Reaction/Time (mins) | | | | |
|---|---|---|---|---|
| 1 | 2 | 3 | 4 | 5 |
| None | Solid/10 | None | None | Solid/10 |

TABLE 2a

| Sample No./Reaction/Time (mins) | | | | |
|---|---|---|---|---|
| 6 | 7 | 8 | 9 | 10 |
| None | None | None | Solid/10 | Solid/10 |

Sample Nos. 11-18 were prepared from the noted constituents in Tables 3 and 4 below, with the (meth)acrylate component being in each case 1,4-butanediol diacrylate in an amount of about 1500 mg, the TU being in each case BTU in an amount of about 50 mg and the oxidant being in each case PEROXYDONE in an amount of about 50 mg. The proton source was varied for each sample and in each case added last.

TABLE 3

| | Sample No./(Amt./mg) | | | |
|---|---|---|---|---|
| Proton Source | 11 | 12 | 13 | 14 |
| Saccharin | — | — | — | 50 |
| Decanol | 50 | — | — | — |
| 1,10-Decanediol | — | 50 | — | — |
| Acrylic acid | — | — | 50 | — |
| Ascorbic acid | — | — | — | — |
| Nicotinic acid | — | — | — | — |
| N-Chlorosaccharin | — | — | — | — |
| Piloty's acid | — | — | — | — |

TABLE 4

| | Sample No./(Amt./mg) | | | |
|---|---|---|---|---|
| Proton Source | 15 | 16 | 17 | 18 |
| Saccharin | — | — | — | — |
| Decanol | — | — | — | — |
| 1,10-Decanediol | — | — | — | — |
| Acrylic acid | — | — | — | — |
| Ascorbic acid | 50 | — | — | — |
| Nicotinic acid | — | 50 | — | — |
| N-Chlorosaccharin | — | — | 50 | — |
| Piloty's acid | — | — | — | 50 |

Each sample was mixed by hand for about 5 seconds. Sample Nos. 11-18 were evaluated, and the results shown below in Tables 3a and 4a:

TABLE 3a

| Sample No./Reaction/Time (mins) | | | |
|---|---|---|---|
| 11 | 12 | 13 | 14 |
| Solid/10 | Solid/15 | Solid/1 | Solid/after 10 |

TABLE 4a

| Sample No./Reaction/Time (mins) | | | |
|---|---|---|---|
| 15 | 16 | 17 | 18 |
| Solid/after 15 | Solid/10 | Solid/1 | Solid/1 |

Sample Nos. 19-23 were prepared from the noted constituents in Table 5 below, with the (meth)acrylate component being in each case 1,4-butanediol diacrylate in an amount of about 1500 mg. The oxidant is in each case PEROXYDONE in an amount of about 50 mg and the TU is in each case BTU in an amount of about 50 mg. Once again, the proton source was varied for each sample and the proton source in each case was added last.

TABLE 5

| Proton source | Sample No./(Amt./mg) | | | | |
|---|---|---|---|---|---|
| | 19 | 20 | 21 | 22 | 23 |
| Benzaldehyde | 50 | — | — | — | — |
| Citronellol | — | 50 | — | — | — |
| Cinnamyl alcohol | — | — | 50 | — | — |
| Lactic acid | — | — | — | 50 | — |
| Citric acid | — | — | — | — | 50 |

Each sample was mixed by hand for about 5 seconds. Sample Nos. 19-23 were evaluated, and the results shown below in Table 5a:

TABLE 5a

| Sample No./Reaction/Time (mins) | | | | |
|---|---|---|---|---|
| 19 | 20 | 21 | 22 | 23 |
| Solid/1 | None | None | Solid/1 | None |

What is claimed is:

1. A two part curable composition comprising:
Part A: A proton source and one or more benzoyl thiourea or benzoyl thiourethane compounds within structures I or IA below:

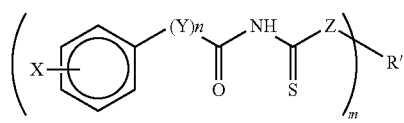

I wherein Z is O or N—R, where R is selected from hydrogen, alkyl, alkenyl, aryl, hydroxyalkyl, hydroxyalkenyl, alkylene (meth)acrylate, carbonyl, carboxyl, or sulfonato, and R' taken together form a carbocyclic or hetero atom-containing ring, or R' is a direct bond attaching to the phenyl ring; wherein X is optional, but when present X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NH-CONHCSNH$_2$)NH—; and n is 0 or 1 and m is 1 or 2, or

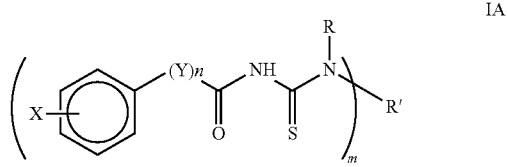

IA wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; wherein X is optional, but when present X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, sulfonate, hydroxyl or haloalkyl; and Y is —SO$_2$NH—, —CONH—, —NH—, and —PO(NH-CONHCSNH$_2$)NH—; and n is 0 or 1 and m is 1 or 2; and
Part B: an oxidant,
wherein at least one of Part A or Part B comprises a (meth)acrylate component.

2. The composition of claim 1, wherein the (meth)acrylate component is represented by $H_2C=CGCO_2R^1$, wherein G may be hydrogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, and sulfone.

3. The composition of claim 1, wherein the oxidant is a member selected from the group consisting of cumene hydroperoxide, para-menthane hydroperoxide, t-amyl hydroperoxide, 1,1,3,3-tetramethylbutyl hydroperoxide, t-butyl hydroperoxide, t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

4. The composition of claim 1, wherein the proton source is selected from the group consisting of water, alcohols, acids, and aldehydes.

5. The composition of claim 1, wherein the proton source is an alcohol selected from the group consisting of hydroxy alkyl (meth)acrylates, alkanols, alkane di- and polyols.

6. The composition of claim 1, wherein the proton source is an acid selected from the group consisting of acrylic acid and polymeric versions thereof, lactic acid, citric acid and combinations thereof.

7. The composition of claim 1, wherein the proton source is an aldehyde selected from the group consisting of formaldeyde, acetaldehyde, ethyl aldehyde, propyl aldehydes, butyl aldehydes and benzaldehyde.

8. The composition of claim 1, wherein the proton source is a silanol.

9. The composition of claim 1, wherein the proton source is a silanol found on the surface of a glass substrate.

10. A bond formed between two mated substrates with the composition of claim 1.

11. The composition of claim 1, wherein the benzoyl thiourea or benzoyl thiourethane compound is selected from one or more of

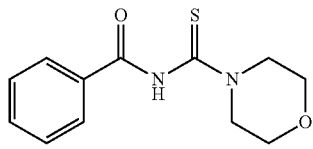

Benzoyl morpholinethiourea (BMTU)

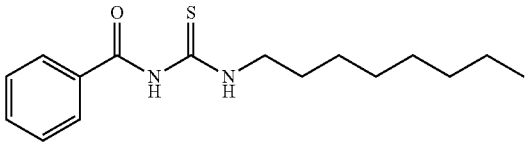

Benzoyl octylthiourea (BOTU)

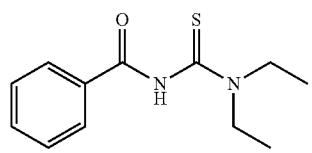

Benzoyl thiodiethylurea (BTDEU)

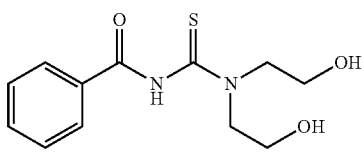

Benzoyl thiodihydroxyethylurea (BTDHEU)

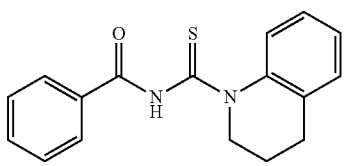

Benzoyl tetrahydroquinoline thiourea (BTHQTU)

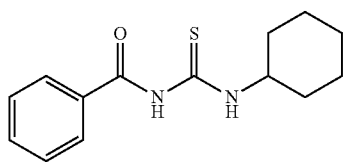

Benzoyl cyclohexylthiourea (BCHTU)

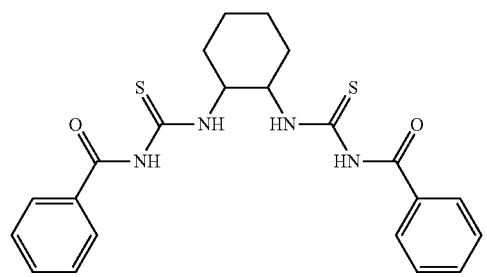

Cyclohexyl bis-Benzoylthiourea (CH bis-BTU)

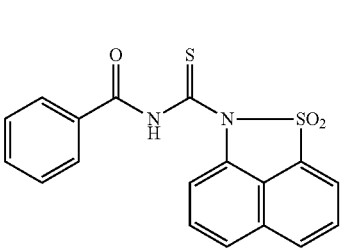

Benzoyl napthosultam thiourea (BNSTU)

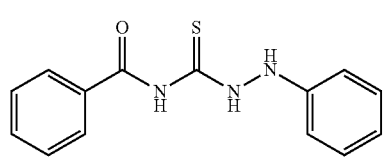

Benzyol phenylhydrazide thiourea (BPHTU)

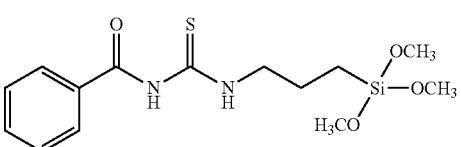

Benzyol thiourea propyl trimethoxysilane (BTU-PTS)

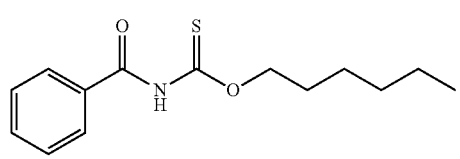

BTU-H Adduct

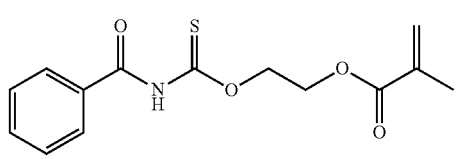

BTU-HEMA Adduct

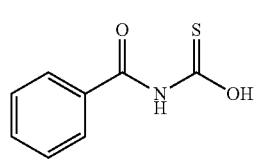

BTU-Water Adduct

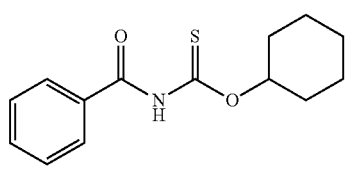

BTU-CH Adduct

-continued
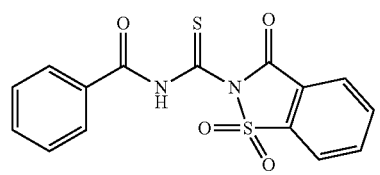
Benzoyl saccharinthiourea (BTU-BS)
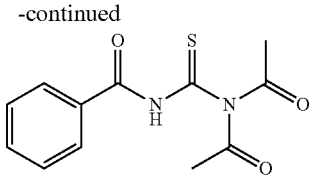
Benzoyl diacetamide urea (BDU)
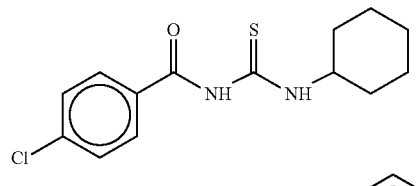
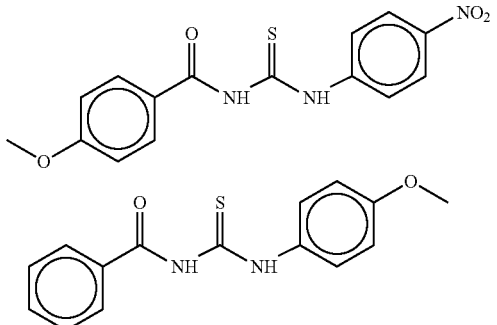
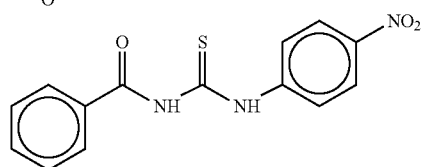
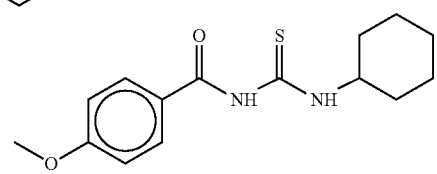
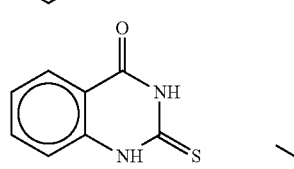
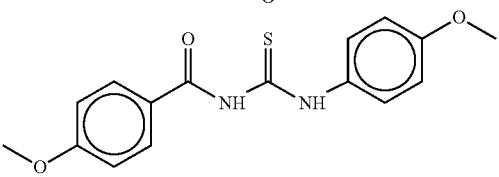
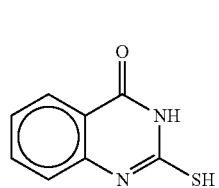
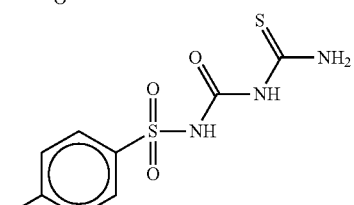
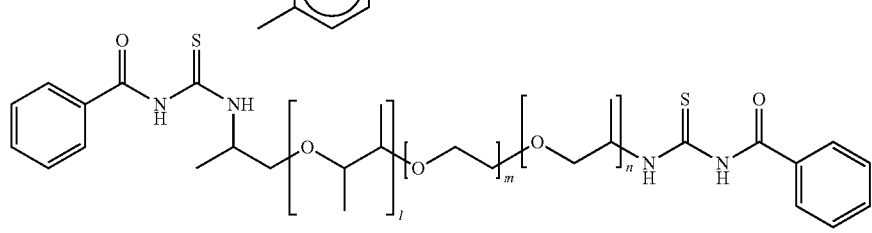
BTU Jeffamine ED-900 Adduct
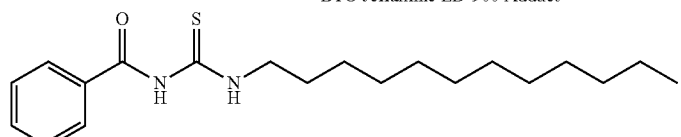
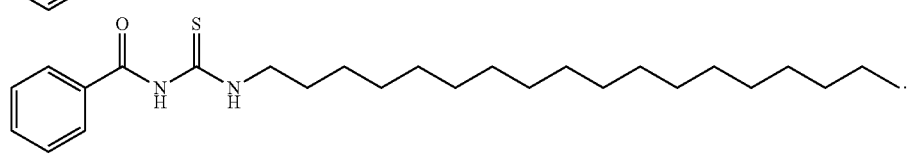
* * * * *

UNITED STATES PATENT AND TRADEMARK OFFICE
CERTIFICATE OF CORRECTION

Page 1 of 1

PATENT NO. : 8,986,847 B2
APPLICATION NO. : 13/795713
DATED : March 24, 2015
INVENTOR(S) : Jacobine et al.

It is certified that error appears in the above-identified patent and that said Letters Patent is hereby corrected as shown below:

In Column 23, Line 62 claim 1 after "or sulfonato," insert --R' is a member selected from the group consisting of hydrogen, alkyl, alkenyl, aryl, hydroxyalkyl, hydroxyalkenyl, alkylene (meth)acrylate, carbonyl, carboxyl, or sulfonate, or R--

Signed and Sealed this
Seventeenth Day of May, 2016

Michelle K. Lee
*Director of the United States Patent and Trademark Office*